United States Patent [19]

Sussman

[11] Patent Number: 5,262,940
[45] Date of Patent: Nov. 16, 1993

[54] PORTABLE AUDIO/AUDIO-VISUAL MEDIA TRACKING DEVICE

[76] Inventor: Lester Sussman, 9800 Bristol Sq. La. #102, Bethesda, Md. 20814

[21] Appl. No.: 571,171

[22] Filed: Aug. 23, 1990

[51] Int. Cl.$^5$ ............................................. G06F 15/24
[52] U.S. Cl. .................................. 364/403; 235/385
[58] Field of Search ............... 364/400, 401, 402, 403, 364/406, 705.01, 705.06, 705.07, 705.08, 709.02, 709.01, 709.09, 710.04; 235/375, 385

[56] References Cited

U.S. PATENT DOCUMENTS

| | | | |
|---|---|---|---|
| Re. 32,655 | 4/1988 | Levine | 364/705.06 |
| 3,999,050 | 12/1976 | Pitroda | 364/705.06 |
| 4,279,022 | 7/1981 | Abe | 364/705.06 |
| 4,628,193 | 12/1986 | Blum | 235/375 |
| 4,634,845 | 1/1987 | Hale et al. | 364/705.06 |
| 4,912,640 | 3/1990 | Tsugei | 364/400 |
| 4,961,158 | 10/1990 | Sussman | 364/710.04 |
| 5,047,614 | 9/1991 | Bianco | 235/385 |

OTHER PUBLICATIONS

IBM Technical Disclosure Bulletin, "Personal Computer", H. P. Hubbard, vol. 19, No. 7 pp. 2419-2423, Dec. 1976.

*Primary Examiner*—Robert A. Weinhardt

[57] ABSTRACT

This invention comprises a compact portable, handheld electronic device that is capable cataloguing and managing an inventory of consumer audio and audio-visual recordings.

The audio and audiovisual recordings include; audio cassette tapes, digital audio tapes, records, compact discs, laser dicsc, video cassette tapes, 8 mm film, 16 mm film etc..

The present invention provides the means for the user to electronically store, retrieve, search, edit, delete, display and print information pertaining to the user's inventory of audio and audio-visual recordings.

Furthermore the present invention provides the means for the user to integrate the inventory data stored in the invention with a larger user database that resides on an external computer, such as a personal computer.

26 Claims, 5 Drawing Sheets

FIG.3g

ALARM

1) ENTER
2) DISPLAY
3) MODIFY
4) DELETE

FIG.3h

ENTER 
 COMPOSITION

1) COMPOSER NAME
2) TITLE
3) CATEGORY
4) RECORDING LENGTH
5) TRACK NUMBER
6) ALL

FIG.3i

ENTER 
 PERFORMER

1) ARTIST NAME
2) CONDUCTOR
3) ORCHESTRA
4) ALL

FIG.3j

ENTER 
 RECORD CO.

1) LABEL NAME
2) LABEL NUMBER
3) USER CLASS. CODE
4) TOTAL ITEMS
5) ALL

FIG.3k

ENTER 
 MEDIA TYPE

1) TYPE
2) SPARS CODE
3) REC. MATERIAL TYPE
4) ALL

FIG.3l

ENTER 
 PURCHASE

1) PRICE
2) PLACE
3) GIFT
4) ALL

FIG.3n

SEARCH 
 COMPOSITION 
1) COMPOSER NAME
2) TITLE
3) CATEGORY
* AND ?

FIG.3p

DELETE 
 GIFT 
1) NAME
2) OCCASSION

FIG.3m

ENTER 
 GIFT 
1) NAME
2) OCCASSION
3) ALL

FIG.3o

MODIFY 
 COMPOSITION 
1) COMPOSER NAME
2) TITLE
3) CATEGORY
4) RECORDING LENGTH

PORTABLE AUDIO/AUDIO-VISUAL MEDIA TRACKING DEVICE

BACKGROUND OF THE INVENTION

This invention relates to a compact portable, hand-held calculator/timepiece, that is capable of storing, retrieving, searching, editing, deleting and outputting of information pertaining to the purchasing of, and collecting of audio and audiovisual media. The audio and audiovisual media comprising of, but not limited to; audio cassette tapes, digital audio tapes, records, compact discs, laser discs, video tapes, 8 mm film, 16 mm film etc..

Many people have large collections of audio media, and/or of audiovisual media, to which they regularly acquire new additions. To catalog and to ensure that no duplicate acquisition is made, can be a time consuming and difficult task if manually done.

Currently people who regularly purchase audio and audiovisual media have no portable automated means to keep track of their existing purchased media. It has been observed that the more dedicated audiophiles keep track of their existing collection by means of index cards, similar to the system used in a public library. This is a manual system whereby the audiophile keeps track of their acquisitions by writing relevant details on a card, which is then added to an existing library of cards. Whenever the user of such a system goes on a buying spree, then the complete card library has to be ported to the record store. This is naturally cumbersome and difficult to maintain.

The present invention provides the means for the user to electronically translate the above described index-card system into a portable and easy to use electronic device. Furthermore the present invention provides the means to the user to integrate the Portable Audio/AudioVisual Media Tracking Device with a larger user database that resides on an external computer, such as a personal computer.

OBJECTIVES OF THE PRESENT INVENTION

Accordingly it is the objective of the present invention to provide a portable electronic calculator timepiece with the facilities for tracking a variety of audio and audiovisual media, consisting of media description data and related purchase data.

The media description data consists of, but is not limited to; the title of the recording; recording studio's name; type of media (compact disc, tape, video cassette tape etc.). This is discussed later in more detail. Henceforth, the media description data will be referred to as the recorded album.

The purchase data consists of, but is not limited to; the purchase price; place of purchase and date of purchase.

It is a further objective of the present invention to provide the means of inputting, storing, editing, retrieving, searching, deleting and outputting of the said recorded album description and purchase data.

It is a further objective of the present invention to provide the means of inputting and tracking purchased recorded albums by a variety of pertinent data. For example a collector of classical music recordings may want to track purchases by the composer's name, as well as by the performing artist and orchestra.

It is a further objective of the present invention to provide the means of inputting and tracking purchased recorded albums, such that the type of recorded album (CD, tape, movie reel etc.) is distinguishable. For example the user may want to distinguish between the cassette tapes and compact discs in his collection.

It is a further objective of the present invention to provide the means of inputting and tracking the purchased recorded album by means of any audio and audiovisual industry code standards. For example tracking audio recorded albums by means of the Consumer Clarification Code developed by the Society of Professional Audio Recording Studios; the SPARS code.

It is a further objective of the present invention to provide the means of inputting and tracking purchased recorded albums by means of the recording studio's name. In the audio recording world, this is the Record Label Name, for example Deutsche Grammophon. In the audiovisual media world this is the Film Studio's Name, for example MCA.

It is a further objective of the present invention to provide the means of inputting and tracking purchased recorded albums by means of any code that the said recording studio may have devised. This is similar to the ISBN number in the publishing world. Each recording studio usually has its own unique item code, which is usually an internal database inventory code.

It is a further objective of the present invention to provide the means of inputting and tracking purchased recorded albums by subcategory. For audio recorded albums this is the type of music, for example, Classical, Jazz, Pop, Heavy Metal etc. For audiovisual recorded albums this the genre of film, for example, Comedy, Science Fiction, Horror etc.

It is a further objective of the present invention to provide the means for bi-directionally transmitting stored information between the present invention and an external computer, and unidirectional to a computer printing device.

Other objectives and further scope of applicability will become apparent from the detailed description given hereinafter. It should be understood that the detailed description and specific examples, are given by way of illustration only, since various changes and modifications within the spirit and scope of the invention will become apparent to those versed in the art from this detailed description.

BRIEF DESCRIPTION OF THE DRAWINGS

For further understanding the present invention and for further objects and advantages thereof, reference is now made to the following description taken in conjunction with the accompanying drawings showing an embodiment of the present invention, in which.

Tables 1 and 2 enumerate the titles and briefly define the functionality of the respective keys on the keypad 15 of the present invention;

FIGS. 3a through 3g are diagrammatic representations of a subset of the various system primary menus generated by the present invention, on the present invention's display 14 unit, in response to a user selected function key on the keypad 13:

FIGS. 3h through 3p are diagrammatic representations of a subset of the various system secondary menus generated by the present invention on the present invention's display 14 unit, in response to a user selected primary menu option:

DETAILED DESCRIPTION OF THE INVENTION

The current invention uses, by way of example only, an embodiment that tracks user audio recorded albums description data and purchase data. To those versed in the art, it will become apparent from the following description, that the said description can as easily apply to a device that tracks audiovisual recorded albums description and purchase data, or to a device that tracks both types of recorded albums.

Figure 1:
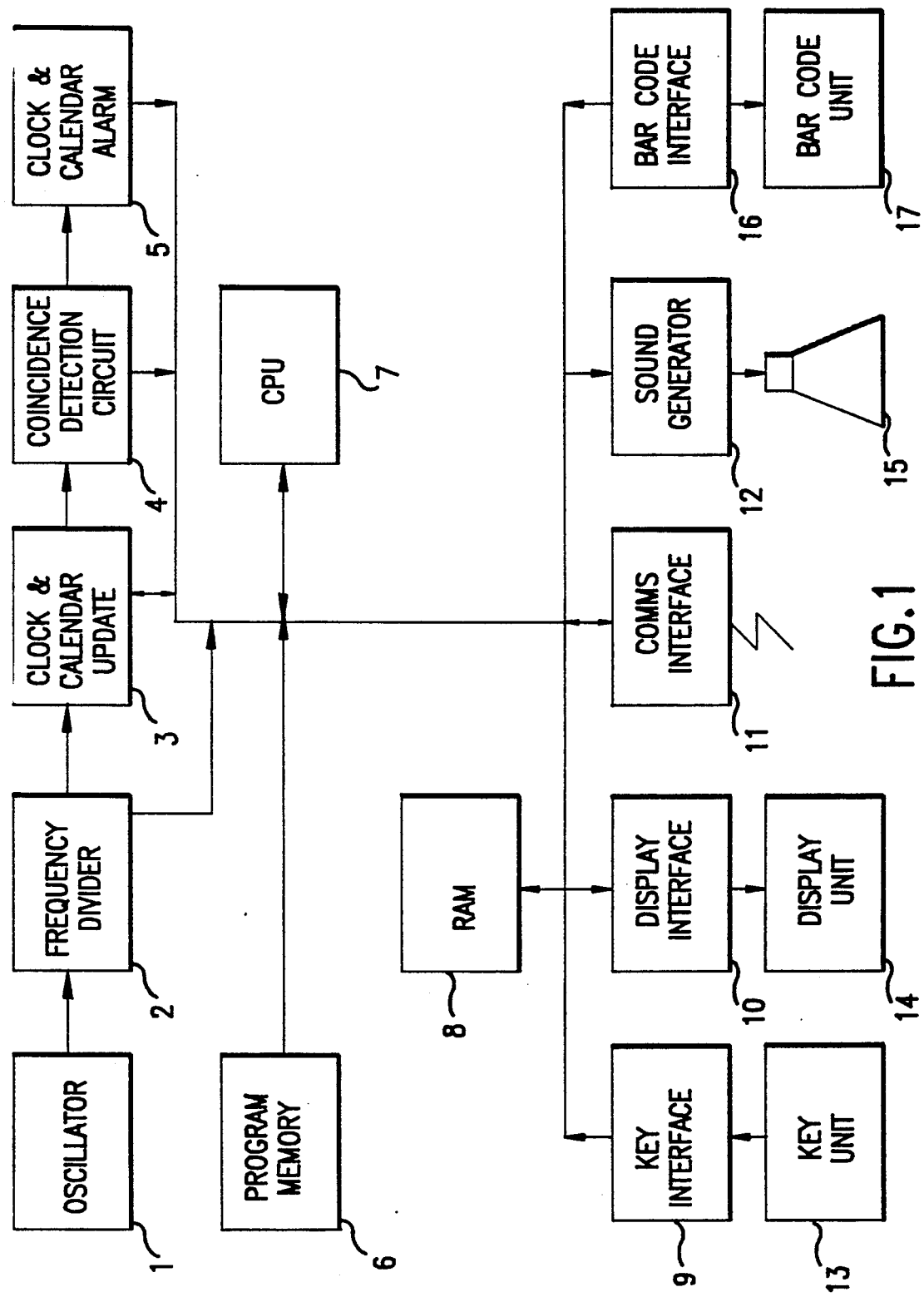
FIG. 1 is a block diagram of a principal circuit of an embodiment of the present invention.

FIG. 1 is a block diagram of a principal circuit for implementing the present invention. The circuit comprises of a circuit oscillator 1, a frequency divider 2, a time keeping counter with calendar functions 3, an alarm coincidence detection circuit 4, clock and calendar alarm memory 5, Program Memory 6, a controller CPU 7, random access memory RAM 8, a keypad interface circuit 9, a keypad unit 13, a display interface circuit 10, a display unit 14, a communications interface circuit 11, a sound generating circuit 12, a speaker 15, a bar code reader interface circuit 16 and a bar code reader unit 17.

The oscillator circuit 1 is coupled to a crystal oscillator, that is not shown, for generating a time base signal in the form of clock pulses of the crystal oscillator's frequency ( for example 32.768 Khz ). The frequency divider 2 is responsive to the clock pulses for frequency dividing of the said frequency to a specific frequency that is applied to the controller CPU 7 and lastly divided to 1 Hz, which is applied to the time keeping counter 3.

The counter 3 provides the present invention with all time and calendar functionality. The 1 Hz frequency generated from the frequency divider 2, generates a signal to maintain the current time in seconds, minutes and hours, as well as current calendar data such as the day of the month and year. This horological data is available to the controller CPU 7 and to the display interface circuit 12.

The clock and calendar alarm circuit 5 contains the user defined alarm time and date information, which is entered into the present invention by means of the keypad 13. The clock and calendar alarm circuit 5 has an associated coincidence detection circuit 4, which determines the equivalency between the alarm time and date stored in the clock and calendar alarm 5, and the current time and date as maintained in the clock and calendar update circuit 3. When an alarm equivalency is detected, the coincidence detection circuit 4 generates a clock and calendar alarm active signal, which is transmitted to the CPU 7.

Program Memory 6 contains all programs that the CPU 7 uses to interface with all of the present invention's circuit modules 1 through 6 and 8 through 17. Program Memory 6 also contains all the programs required to enter, store, retrieve, edit and delete all data in RAM 8. Program Memory 6 also contains programs to send and receive recorded album data between the present invention and a remote computer, via the communications interface 11. Furthermore Program Memory 6 also contains all non-volatile system messages, ( for example, functional menus and error messages ), that are to be displayed via the display interface circuit 10 and the display unit 14.

RAM 8 stores all the dynamic user recorded albums description data and related purchase data, as well as any other user dynamic data.

The keypad interface circuit 9 receives an output from a user selected key on the keypad 13, delivers its corresponding coded key output, senses the meaning of the key output and develops an output representative of its results, that is interpreted by the CPU 7.

The display interface 10 controls the display unit 14 by means of data received from the CPU 7. The display unit 14 could be any form of display that present technology avails, for example LCD or LED displays. Because of the relatively low power consumption of the present day LCD technology, this said form of display unit is used by way of preference in the embodiment of the present invention.

The communications interface 11 allows bi-directional transfer of information between the present invention and a remote computer (not shown). This said circuit establishes and breaks the communications link and maintains the integrity of the data transferred between the present invention and a remote computer. The technology used to implement the said circuit could be anything that current technology avails, for example RS-232C or GPIB interface protocols. The communication's interface 11 also facilitates the unidirectional transfer of data between the present invention's preferred embodiment and a remote printer (not shown).

The bar code interface circuit 16 allows the user to input data in the form of a bar code, provided that a bar code reader 17 is connected to the present invention. This allows some data to be automatically scanned into the present invention, instead of the user having to enter it by means of the keypad 13.

Figure 2:
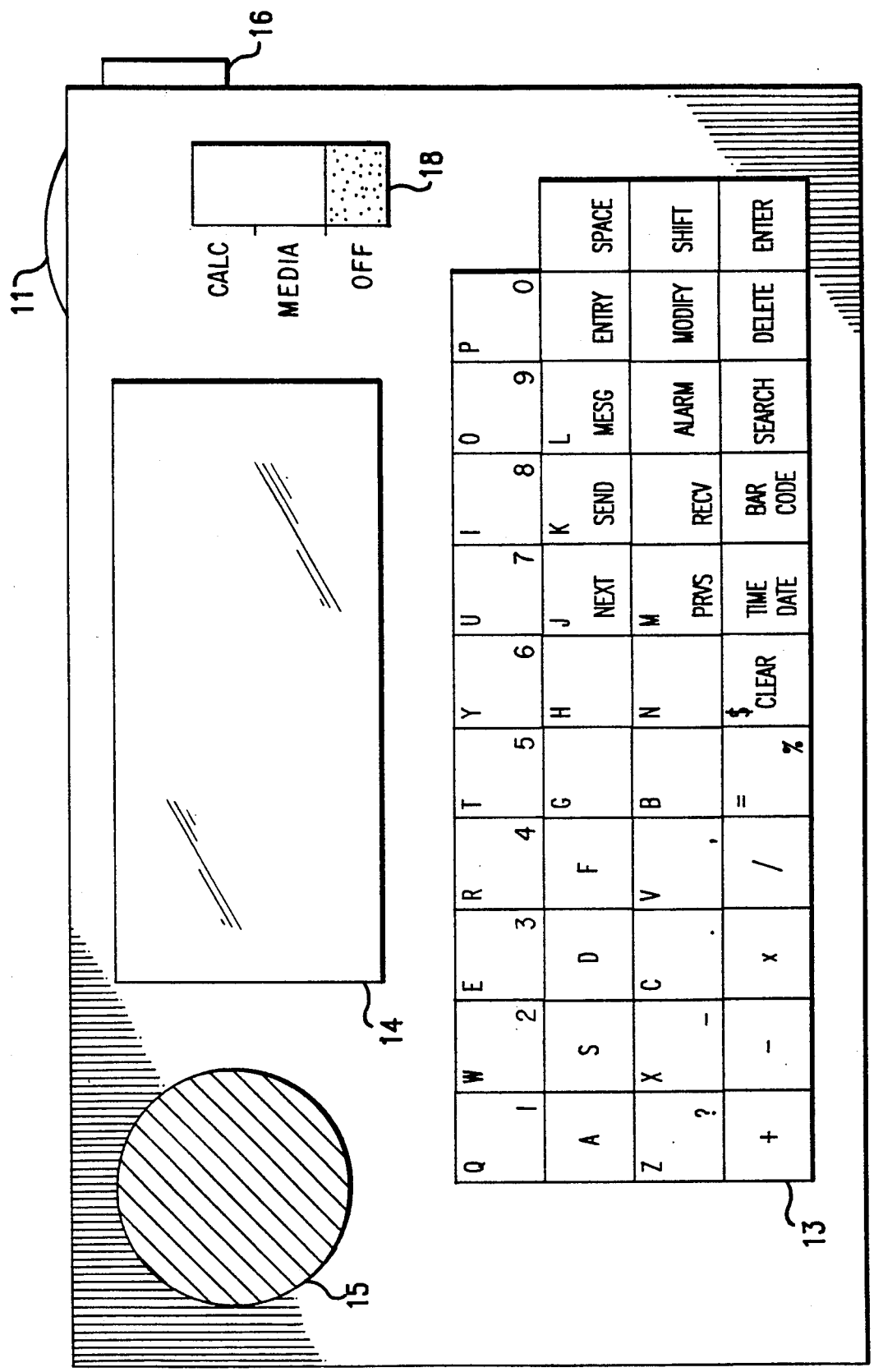
FIG. 2 is a plan view of the perspective of the illustrated embodiment.

FIG. 2 is a plan view showing the perspective of the illustrated embodiment, which includes the keypad 13, the display panel 14, the communications interface 11, the speaker 15, the bar code interface 16 and in addition, a mode selector switch 18. The mode selector switch 18 enables the user to select either one of three modes; the OFF mode which disables all of the present invention's functionality, except for any set alarm conditions and stored information in the invention's memory; the MEDIA mode, which enables the user to manipulate recorded albums' information with the said invention; and lastly the CALC mode, which enables the user to use the present invention as a normal calculator.

Tables 1 and 2 enumerate the titles of the respective keys on the keypad 13.

TABLE 1

Figure 3A:
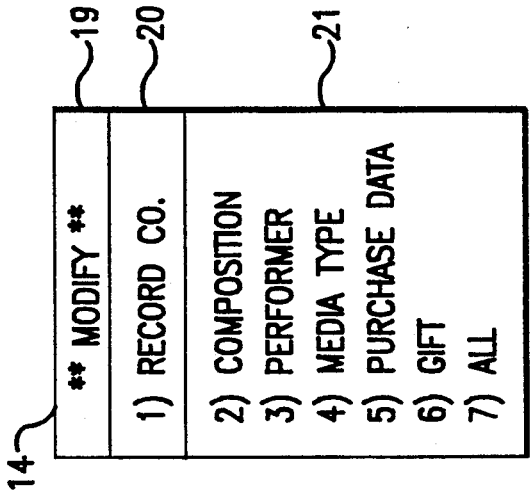
Figure 3B:
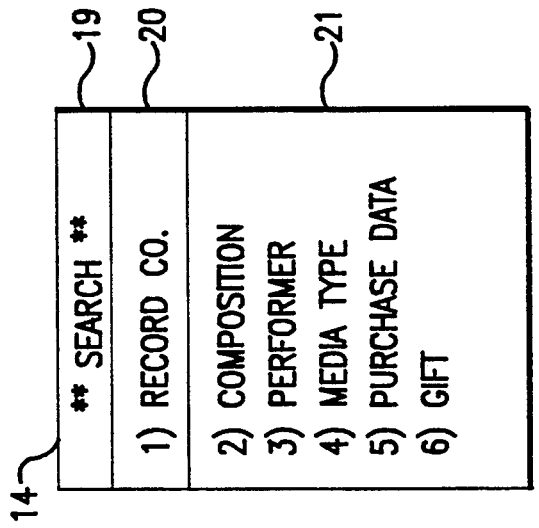
Figure 3C:
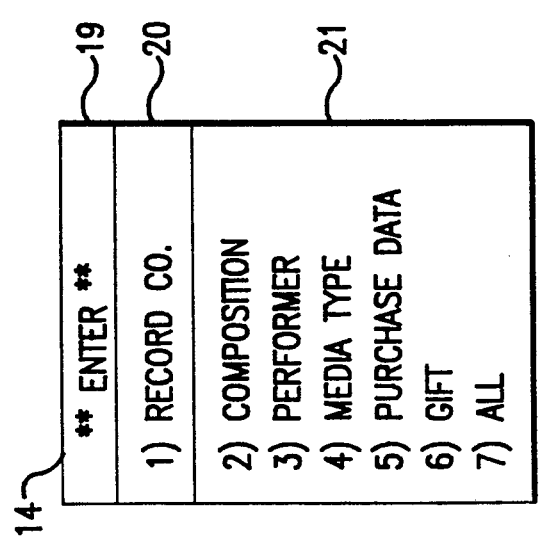
Figure 3D:
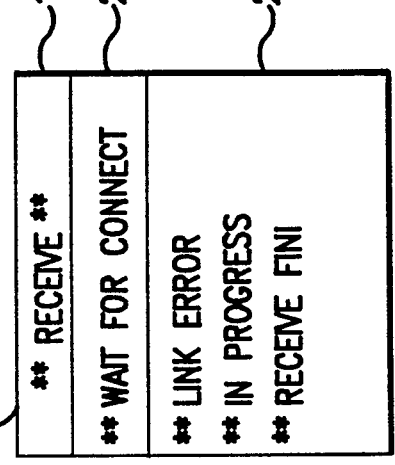

| SYMBOL KEY | KEY DESCRIPTION |
| --- | --- |
| 0-9 | numeric keys |
| A-Z | alphabet keys |
| +, −, /, * | calculator function keys |
| ALARM | Function key to enter a new alarm date and time and associated message into clock & calendar alarm 5 circuit, or display, edit, or delete an existing alarm date and time and/or message that is stored in the clock & calendar alarm |
| BAR CODE | Function key to scan data into the invention by means of a bar code reader 17. |
| CLEAR | Clear the currently displayed information, or cancels the previously selected function key. |
| DELETE | Function key that displays the Delete primary menu, FIG. 3d, such that the user can delete a specific entry, or entries from the present invention. |
| ENTER | Completes a multi-key function sequence. |

TABLE 1-continued

| SYMBOL KEY | KEY DESCRIPTION |
|---|---|
| ENTRY | Function key that displays the new Entry primary menu, FIG. 3a, such that the user can enter a new entry, or entries into the present invention. |
| MSG | Function key to enter new message(s) into clock & calendar alarm 5 circuit, or display, edit, or delete existing message(s) that is stored in the clock & calendar alarm 5. Note that the alarm function is disabled. |
| MODIFY | Function key that displays the Modify primary menu, FIG. 3c, such that the user can modify a specific entry, or entries in the present invention. |

TABLE 2

| SYMBOL KEY | KEY DESCRIPTION |
|---|---|
| NEXT | Scroll forward the displayed menu or stored recorded albums' data. |
| PRVS | Scroll backward the displayed menu or stored recorded albums' data. |
| RECEIVE | Function key to receive recorded albums' data via the communications interface 13 from a remote computer. |
| SEARCH | Function key that displays the Search primary menu, FIG. 3b, such that the user can search for specific entries stored in the present invention, based upon specific search criteria. |
| SEND | Function key to send recorded albums' data via the communications interface 11 to a remote computer, or printer. |
| SHIFT | Allows the user to select the secondary key that is available on a double-function key on the keypad 13. |
| SPACE | ACSII 32 equivalent, i.e. space character. |
| TIME DATE | Function key to display the current date and time. <SHIFT> <TIME DATE> enables the user to set the time and/or date. |

Before describing in detail FIGS. 3a through 3p, a note needs to be made about the user interaction with the preferred embodiment of the invention. The present invention interacts with the user by means of function keys (see FIG. 2, tables 1 and 2) on the keypad 13 and system generated menus (FIGS. 3a through 3p) on the display 14.

Furthermore the system menus are divided into primary and secondary menus. The primary menus (FIGS. 3a through 3g) appear on the display 14 after the user has selected a function key on the keypad 13. The secondary menus appear on the display 14 (FIGS. 3h through 3p) in response to the user selecting an item on the primary menu and consequently allow the user to enter/select related data in the invention. Not all of the primary and secondary menus are illustrated. This is because many menus are similar and consequently in the Detailed Description, reference is made to similar menu diagrams, rather than fully describe all of the possible system menus.

It is possible to expand the number of function keys on the keypad 13 instead of using the system menus. The preferred embodiment of the invention uses system menus by way of illustration only. Additional function keys could as easily be used by the present invention to interface between the user and the invention.

FIGS. 3a through 3p illustrate the display 14 when a menu function key of the present invention is selected on the keypad 13; ENTRY, MODIFY, DELETE, SEARCH, SEND, RECEIVE and ALARM. The visible display 14 is divided into 2 lines. The top most line 19 illustrates the type of function key selected. For example if the ENTRY key is selected, then the message ' Enter ' is displayed on the top line 19 (see FIG. 3a). The bottom line 21 and 21 illustrate a menu of available selections for the function defined on the top line 19. For example in FIG. 3a, the user is able to Enter data into the invention by;

1) Composition
2) Performer
3) Record Company
4) Media Type
5) Purchase
6) Gift
7) All.

Only a single line of a menu's available selection is displayed in the present invention, namely line 20. The user has to use the scroll keys, NEXT or PRVS on the keypad 13 to access the hidden selections, which are illustrated by means of a broken line in FIGS. 3a through 3p (line 21). The NEXT key allows the user to scroll forward and the PRVS key enables the user to scroll backwards. For example, in FIG. 3a, if the user presses the NEXT key twice, the display 14, bottom line 20 would contain '3) Performer'. If the user now presses the PRVS key once, the display 14, bottom line 20 would contain '2) Composition'. To execute a currently displayed menu function the user presses the ENTER key on the keypad 13. To cancel a currently displayed menu function, the user presses the CLEAR key on the keypad 13. Throughout these scrolling actions the display 14, top line 19 remains static and unchanged—for example in FIG. 3a, the display 14 top line 19 would continuously display ' Enter  ' whilst the user scrolled through the available menu selections, displayed in the bottom line 20. As mentioned previously the following detailed description applies to audio recorded albums, by way of example only. Reference is also made to equivalences in audiovisual recorded albums, but the primary description of the current invention's embodiment is devoted to audio recorded albums.

A note needs to be made about the data structure of an audio recording, e.g. a CD. Each recorded album is uniquely identified by its Record Co. data (see FIG. 3j). The recorded album can consist of one or more tracks of different compositions, which may or may not have the same performers. For example, a CD can have both Beethoven's 4th Symphony and Brahms' 4th Symphony, or a tape can have a unique collection of songs by the Beatles and the Rolling Stones. Consequently the present invention provides the means to distinguish between various compositions and its performers on the same recorded album, if the user wants to track these compositions separately. Quite frequently the same composition appears on different recordings. For example, Beethoven's 5th Symphony has been recorded on the CBS label on many different CDs. For example CBS MT-32010 is with Bernstein conducting the New York Philharmonic and CBS MT-35892 is with Mehta conducting the New York Philharmonic. To an audiophile the ability to distinguish between these two recordings, of the same composition, is important.

FIG. 3a illustrates the display 14 when the ENTRY function key is selected on the keypad 13. Selecting this function allows the user to enter into the invention new recorded albums' description data and related purchase data, which is stored in RAM 8. For example, if the user has bought a new CD and wants to enter it into the invention, then this said function key is selected. Note that the mode selector switch 18 needs to be in the MEDIA position. The user is able to enter the recorded albums' data under various categories—the primary menu options, which are listed in the scroll display, lines 20 and 21.

The ENTRY function primary menu item '1) Record Co.' allows the user to enter a new recorded album by Record Company. The Record Company is the company that produced and recorded the recorded album. This is part of the primary access key to the data stored in RAM 8. To select this option, the user presses the ENTER key whilst the Record Co. menu item is displayed on the display 14 bottom line 20, or the user can simply select the number '1' (one) on the keypad 13. Once the user has selected this menu item, a secondary menu appears on the display 14, the Enter Record Co. menu FIG. 3j, which is described in detail later. The Record Co. recorded album's description data is a repeating item. For example, the user may elect to enter consecutively, multiple CDs into the invention.

The ENTRY function primary menu item '2) Composition' allows the user to enter a new composition for a given recorded album. A composition may be a symphony, a concerto etc. in the Classical music category; or it may be a song in the Jazz and Pop music categories. To select this option, the user presses the ENTER key whilst the Composition menu item is displayed on the display 14 bottom line 20, or the user can simply select the number '2' (two) on the keypad 13. Once the user has selected this menu item, a secondary menu appears on the display 14, the Enter Composition menu FIG. 3h, which is described in detail later. The Composition recorded album's description data is a repeating item. For example, on a given CD there can be multiple Compositions. Note that if the user had not previously defined a unique CD, by means of the Record Co. primary menu option, then before the secondary Enter Composition menu appears on the display 14, the current invention prompts the user for this data by displaying the message ' ERROR: no album selected ', and then displays the Enter Record Co. secondary menu (FIG. 3j). The equivalent Composition data for an audiovisual recorded album would be Film, TV Serial etc.

The ENTRY function primary menu item '3) Performer' allows the user to enter a new performer for a given recorded album. A performer may be a conductor, or an orchestra, or an opera singer, or a pianist etc. in the Classical music category; it may be a singer, or a saxophonist etc. in the Jazz and Pop music categories. To select this option, the user presses the ENTER key whilst the Performer menu item is displayed on the display 14 bottom line 20, or the user can simply select the number '3' (three) on the keypad 13. Once the user has selected this menu item, a secondary menu appears on the display 14, the Enter Performer menu FIG. 3i, which is described in detail later. Note that if the user had not previously defined a unique CD, then before the secondary Enter Performer menu appears on the display 14, the current invention prompts the user for this data by displaying the message ' ERROR: no album selected ', and then display the Enter Record Co. secondary menu. The Performer recorded album's description data is a repeating item. For example, on a given CD there can be multiple Performers. The equivalent data for an audiovisual recorded album would be Actor, Directors etc.

The ENTRY function primary menu item '4) Media Type' allows the user to enter a new recorded album into the present invention by recorded album's type, for example CDs, tapes or LP records etc.. To select this option, the user presses the ENTER key whilst the Media Type menu item is displayed on the display 14 bottom line 20, or the user can simply select the number '4' (four) on the keypad 13. Once the user has selected this menu item, a secondary menu appears on the display 14, the Enter Media Type menu FIG. 3k, which is described in detail later. This data is always directly associated with Record Co. description data and cannot exist without the associated Record Co. being defined by the user. Prior to the user entering the Media Type data, the present invention checks to see if it is associated with any Record Co. data. If no such association exists the present invention automatically prompts the user to enter the required data by displaying the message ' ERROR: no album selected ', and then the Enter Record Co. secondary menu, FIG. 3j. The Media Type description data is a repeating item. For example, the user may elect to enter consecutively, multiple CDs into the invention.

The ENTRY function primary menu item '5) Purchase Data' allows the user to enter purchase description data into the present invention, for a recorded album that currently exists in RAM s. To select this option, the user presses the ENTER key whilst the Purchase Data menu item is displayed on the display 14 bottom line 20, or the user can simply select the number '5' (five) on the keypad 13. Once the user has selected this menu item, a secondary menu appears on the display 14, the Enter Purchase Data menu FIG. 3l, which is described in detail later. This data is always directly associated with Record Co. description data and cannot exist without the associated Record co. being defined by the user. Prior to the user entering the Purchase Data, the present invention checks to see if it is associated with any Record Co. data. If no such association exists the present invention automatically prompts the user to enter the required data by displaying the message ' ERROR: no selected album ', and then display the Enter Record Co. secondary menu.

The ENTRY function primary menu item '6) Gift' allows the user to label the recorded album that currently exists in RAM 8, as having been purchased as a gift and consequently is not part of the user's personal collection. To select this option, the user presses the ENTER key whilst the Gift menu item is displayed on the display 14 bottom line 20, or the user can simply select the number '6' (six) on the keypad 13. Once the user has selected this menu item, a secondary menu appears on the display 14, the Enter Gift menu FIG. 3m, which is described in detail later. This data is always directly associated with Record Co. description data and cannot exist without the associated Record Co. being defined by the user. Prior to the user entering the Gift data, the present invention checks to see if it is associated with any Record Co. data. If no such association exists the present invention automatically prompts the user to enter the required data by displaying the message ' ERROR: no selected album ', and then display the Enter Record Co. secondary menu.

The ENTRY function primary menu item '7) All' allows the user to enter recorded albums' data into RAM 8. This option differs from all of the previously described data entry menu items, such that the present invention automatically prompts the user for all data entry description data, rather than the user selecting the required data entry item from a menu. To select this option, the user presses the ENTER key whilst the All menu item is displayed on the display 14 bottom line 20, or the user can simply select the number '7' (seven) on the keypad 13. Once the user has selected this menu item, the invention first prompts the user for Record Co. data and waits for the user to enter the relevant data; it then prompts the user for Media Type data and waits for the user to enter the relevant data; it then prompts the user for Purchase Data and waits for the user to enter the relevant data it then prompts the user for Gift data and waits for the user to enter the relevant data: it then prompts the user for Composition data and waits for the user to enter the relevant data: it then prompts the user for Composition's associated Performer data and waits for the user to enter the relevant data.

FIG. 3b illustrates the display 14 when the SEARCH function key is selected on the keypad 13. Selecting this function allows the user to search recorded albums' description data and related purchase data stored in RAM 8 data. The mode selector switch 18 needs to be in the MEDIA position. The user is able to search for stored data by various search criteria—the primary menu options, which are listed in the scroll display, lines 20 and 21.

The SEARCH function primary menu item '1) Record Co.' allows the user to search RAM 8 for all recorded albums recorded by a specific Record Company. To select this option, the user presses the ENTER key whilst the Record Co. menu item is displayed on the display 14 bottom line 20, or the user can simply select the number 'i' (one) on the keypad 13. Once the user has selected this menu item, a secondary menu appears on the display 14, the Search Record Co. menu, which is not shown, but is similar to FIG. 3i.

The SEARCH function primary menu item '2) Composition' allows the user to search RAM 8 for a specific Composition. To select this option, the user presses the ENTER key whilst the Composition menu item is displayed on the display 14 bottom line 20, or the user can simply select the number '2' (two) on the keypad 13. Once the user has selected this menu item, a secondary menu appears on the display 14, the search Composition menu FIG. 3n, which is described in detail later. This function could be used by the user to see if a specific Composition is already on another CD that currently exists in the user's CD library. If found then this could prevent the user from purchasing a duplicate recording of the same Composition.

The SEARCH function primary menu item '3) Performer' allows the user to search RAM 8 for all recorded albums that have a recording with the specific Performer. To select this option, the user presses the ENTER key whilst the Performer menu item is displayed on the display 14 bottom line 20, or the user can simply select the number '3' (three) on the keypad 13. Once the user has selected this menu item, a secondary menu appears on the display 14, the search Performer menu FIG. 3n, which is described in detail later.

The SEARCH function primary menu item '4) Media Type' allows the user to search RAM 8 by a specific recorded album type, for example, the user can search for all CDs stored in RAM 8. To select this option, the user presses the ENTER key whilst the Media Type menu item is displayed on the display 14 bottom line 20, or the user can simply select the number '4' (four) on the keypad 13. Once the user has selected this menu item, a secondary menu appears on the display 14, the Search Media Type menu, which is not shown, but is similar to FIG. 3k.

The SEARCH function primary menu item '5) Purchase Data' allows the user to search RAM 8 for recorded albums by specific Purchase Data criteria. To select this option, the user presses the ENTER key whilst the Purchase Data menu item is displayed on the display 14 bottom line 20, or the user can simply select the number '5' (five) on the keypad 13. Once the user has selected this menu item, a secondary menu appears on the display 14, the Search Purchase Data menu, which is not shown, but is similar to FIG. 3l.

The SEARCH function primary menu item '6) Gift' allows the user to search RAM 8 for specific recorded albums that have been purchased as a gift. To select this option, the user presses the ENTER key whilst the Gift menu item is displayed on the display 14 bottom line 20, or the user can simply select the number '6' (six) on the keypad 13. Once the user has selected this menu item, a secondary menu appears on the display 14, the search Gift menu, which is not shown, but is similar to FIG. 3m.

FIG. 3c illustrates the display 14 when the MODIFY function key is selected on the keypad 13. Selecting this function allows the user to modify recorded albums' description data and/or related purchase data stored in RAM 8. The mode selector switch 18 needs to be in the MEDIA position. The user is able to modify stored data by various criteria—the primary menu options, which are listed in the scroll display, lines 20 and 21.

The MODIFY function primary menu item '1) Record Co.' allows the user to modify Record Co. data for a recorded album data stored in RAM 8. To select this option, the user presses the ENTER key whilst the Record Co. menu item is displayed on the display 14 bottom line 20, or the user can simply select the number '1' (One) on the keypad 13. Once the user has selected this menu item, a secondary menu appears on the display 14, the Modify Record Co. menu, which is not shown, but is similar to FIG. 3j.

The MODIFY function primary menu item '2) Composition' allows the user to modify Composition data for a recorded album stored in RAM 8. To select this option, the user presses the ENTER key whilst the Composition menu item is displayed on the display 14 bottom line 20, or the user can simply select the number '2' (two) on the keypad 13. Once the user has selected this menu item, a secondary menu appears on the display 14, the Modify Composition menu, which is not shown, but is similar to FIG. 3h. This data is always directly associated with Record Co. description data and cannot exist without the associated Record Co. Prior to the secondary Modify Composition menu being displayed, the present invention checks to see if it has associated the current MODIFY function With any Record Co. data. If no such association exists the present invention automatically prompts the user to enter the required data by displaying the message ' ERROR: no selected album ', and then displays the Enter Record Co. secondary menu FIG. 3j, so that the invention knows which Composition to modify.

The MODIFY function primary menu item '3) Performer' allows the user to modify Performer data for a recorded album stored in RAM 8. To select this option, the user presses the ENTER key whilst the Performer menu item is displayed on the display 14 bottom line 20, or the user can simply select the number '2' (two) on the keypad 13. Once the user has selected this menu item, a secondary menu appears on the display 14, the Modify Performer menu, which is not shown, but is similar to FIG. 3i. Prior to the secondary Modify Performer menu being displayed, the present invention checks to see if it has associated the current Modify function with any Record Co. data. If no such association exists the present invention automatically prompts the user to enter the required data by displaying the message ' ERROR: no selected album ', and then displays the Enter Record Co. secondary menu FIG. 3j, so that the invention knows which Performer to modify.

The MODIFY function primary menu item '4) Media Type' allows the user to modify Media Type data stored in RAM 8. To select this option, the user presses the ENTER key whilst the Media Type menu item is displayed on the display 14 bottom line 20, or the user can simply select the number '4' (four) on the keypad 13. Once the user has selected this menu item, a secondary menu appears on the display 14, the Modify Media Type menu, which is not shown, but is similar to FIG. 3k. This data is always directly associated with Record Co. description data and cannot exist without the associated Record Co.. Prior to the secondary Modify Media Type menu being displayed, the present invention checks to see if it has associated the current Modify function with any Record Co. data. If no such association exists the present invention automatically prompts the user to enter the required data by displaying the message ' ERROR: no selected album ', and then displays the Enter Record Co. secondary menu FIG. 3j, so that the invention knows which Media Type to modify.

The MODIFY function primary menu item '5) Purchase Data' allows the user to modify Purchase Data stored in RAM 8. To select this option, the user presses the ENTER key whilst the Purchase Data menu item is displayed on the display 14 bottom line 20, or the user can simply select the number '5' (five) on the keypad 13. Once the user has selected this menu item, a secondary menu appears on the display 14, the Modify Purchase Data menu, which is not shown, but is similar to FIG. 3l. This data is always directly associated with Record Co. description data and cannot exist without the associated Record Co.. Prior to the secondary Modify Purchase Data menu being displayed, the present invention checks to see if it has associated the current MODIFY function with any Record Co. data. If no such association exists then the present invention automatically prompts the user to enter the required data by displaying the message ' ERROR: no selected album ', and then displays the Enter Record Co. secondary menu FIG. 3j, so that the invention knows which Purchase Data to modify.

The MODIFY function primary menu item '6) Gift' allows the user to modify Gift data stored in RAM 8. To select this option, the user presses the ENTER key whilst the Gift menu item is displayed on the display 14 bottom line 20, or the user can simply select the number '6' (six) on the keypad 13. Once the user has selected this menu item, a secondary menu appears on the display 14, the Modify Gift menu, which is not shown, but is similar to FIG. 3m. This data is always directly associated with Record Co. description data and cannot exist without the associated Record co.. Prior to the secondary Modify Gift menu being displayed, the present invention checks to see if it has associated the current Modify function with any Record Co. data. If no such association exists the present invention automatically prompts the user to enter the required data by displaying the message ' ERROR: no selected album ', and then displays the Enter Record Co. secondary menu FIG. 3j, so that the invention knows which Purchase Data to modify.

The MODIFY function primary menu item '7) All' allows the user to modify all of a recorded album's data in RAM 8. This option differs from all of the previously described data modification menu items, such that the present invention automatically prompts the user for all data entry description data, rather than the user selecting the required data entry item from a menu. To select this option, the user presses the ENTER key whilst the All menu item is displayed on the display 14 bottom line 20, or the user can simply select the number '7' (seven) on the keypad 13. Once the user has selected this menu item, the invention first prompts the user to identify the Record Co. data, displays the associated data and waits for the user to modify the relevant data; it then displays the Media Type data and waits for the user to modify the relevant data; it then displays the Purchase Data and waits for the user to modify the relevant data; it then displays the Gift data and waits for the user to modify the relevant data; it then displays the Composition data and waits for the user to modify the relevant data; it then displays the Composition's associated Performer data and waits for the user to modify the relevant data.

FIG. 3d illustrates the display 14 when the DELETE function key is selected on the keypad 13. Selecting this function allows the user to delete recorded albums' description data and related purchase data stored in RAM 8 data. The mode selector switch 18 needs to be in the MEDIA position. The user is able to delete stored data by various criteria—the primary menu options, which are listed in the scroll display, lines 20 and 21.

The DELETE function primary menu item '1) Title' allows the user to delete recorded albums' data stored in RAM 8 by specifying a composition Title. Refer to FIG. 3h and its associated description for more detail on the title item. To select this option, the user presses the ENTER key whilst the Title menu item is displayed on the display 14 bottom line 20, or the user can simply select the number '1' (one) on the keypad 13. Once the user has selected this menu item, the present invention checks to see if valid recorded albums' data, indexed by the Title, exists in RAM 8. If the data does exist, then a message is displayed requesting user confirmation to delete the recorded albums' data from RAM 8. If the data does not exist, then the present invention automatically prompts the user to re-enter the required data, or CANCEL the function, by displaying the message ' ERROR: Title does not exist ', and waits for the user's data entry. If more than one Title exists on several different recorded albums (e.g. same Title recorded on different Labels), then the list of the different recorded albums, by Label Name and Label Number, are displayed in the bottom line 20 and 21. The user can scroll through the list with the NEXT and PRVS function keys on the keypad 13 and select the required recorded album by using the ENTER function key when the recorded album's Label data is displayed in the bottom line 20.

The DELETE function primary menu item '2) User Class. Code' allows the user to delete a specific recorded album's data from RAM 8 by specifying the user associated classification code. The User Class. Code is unique for each recorded album. Refer to FIG. 3j and its associated description for more detail on this said code.

To select this option, the user presses the ENTER key whilst the User Class. Code menu item is displayed on the display 14 bottom line 20, or the user can simply select the number '2' (two) on the keypad 13. Once the user has selected this menu item, the present invention prompts the user to enter the User Class. Code on the keypad. The present invention checks to see if the recorded album, indexed by the User Class. Code, exists in RAM 8. If the recorded album data does exist, then a message is displayed requesting user confirmation to delete the recorded album's data from RAM 8. If the data does not exist, then the present invention automatically prompts the user to re-enter the required data, or to CANCEL the function, by displaying the message ' ERROR: User Class. Code does not exist ', and waits for the user's data entry. Alternatively to entering the User Class. Code on the keypad, the user can scroll through a list of the existing User Class. Codes stored in RAM 8 by pressing either the PRVS or NEXT function keys on the keypad. The user can then scroll through the displayed list by using the PRVS and NEXT keys until the desired data is displayed on the display bottom line 20, and then pressing the ENTER key on the keypad 13.

The DELETE function primary menu item '3) Label Number' allows the user to delete recorded album's data stored in RAM 8 by specifying a Label Number. Refer to FIG. 3*j* and its associated description for more detail on this said code. To select this option, the user presses the ENTER key whilst the Label Number menu item is displayed on the display 14 bottom line 20, or the user can simply select the number '3' (three) on the keypad 13. Once the user has selected this menu item, the present invention checks to see if the recorded album, indexed by the Label Number, exist in RAM 8. If the data does exist, then a message is displayed requesting user confirmation to delete the recorded album data from RAM 8. If the data does not exist, then the present invention automatically prompts the user to re-enter the required data, or CANCEL the current function, by displaying the message ' ERROR: Label Number does not exist ', and waits for the user's data entry. Alternatively to entering the Label Number on the keypad, the user can select to scroll through a list of the existing Label Numbers stored in RAM 8. The user can scroll through the displayed list by using the PRVS and NEXT keys until the desired data is displayed on the display bottom line 20, and then pressing the ENTER key on the keypad 13.

The DELETE function primary menu item '4) Media Type' allows the user to delete recorded album's data from RAM 8 by specifying the recorded albums' type. For example, the user can delete all recorded albums' data in RAM 8 for CDs, or cassette tapes. To select this option, the user presses the ENTER key whilst the Media Type menu item is displayed on the display 14 bottom line 20, or the user can simply select the number '4' (four) on the keypad 13. Once the user has selected this menu item, the present invention checks to see if the recorded albums, indexed by the Media Type, exist in RAM 8. If the data does exist, then a message is displayed requesting user confirmation to delete the recorded albums' data from RAM 8. If the data does not exist, then the present invention automatically prompts the user to re-enter the required data, or to CANCEL the present function, by displaying the message ' ERROR: Media Type does not exist ', and waits for the user's data entry. Alternatively to entering the Media Type on the keypad, the user can select to scroll through a list of the existing Media Type stored in RAM 8. The user can scroll through the displayed list by using the PRVS and NEXT keys until the desired data is displayed on the display bottom line 20, and then pressing the ENTER key on the keypad 13.

The DELETE function primary menu item '5) Gift' allows the user to delete recorded album's data from RAM 8 that was purchased as a Gift. To select this option, the user presses the ENTER key whilst the Gift menu item is displayed on the display 14 bottom line 20, or the user can simply select the number '5' (five) on the keypad 13. Once the user has selected this menu item, a secondary menu appears on the display 14, the Delete Gift menu, FIG. 3*p*. This secondary menu allows the user to delete Gift data by specifying either the Name of the person for whom the recorded albums were purchased, or by specifying the occasion for they were purchased. Once the user has selected secondary menu item, the present invention then checks to see if the recorded albums, indexed by the Gift and a secondary menu item (Name or Occasion), exist in RAM 8. If the data does exist, then a message is displayed requesting user confirmation to delete the recorded albums' data from RAM 8. If the data does not exist, then the present invention automatically prompts the user to re-enter the required data, or to CANCEL the present function by displaying the message ' ERROR: Gift data does not exist ', and waits for the user's data entry. If more than one Gift exists on several different recorded albums (e.g. at Christmas the user purchased 10 CDs for 10 different people), then the list of different recorded albums, by Gift Name, are displayed in the bottom line 20 and 21. The user can then scroll through the list with the NEXT and PRVS function keys on the keypad 13 and select the required recorded albums by using the ENTER function key when the recorded album's Gift Name data is displayed in the bottom line 20.

Figure 3E:
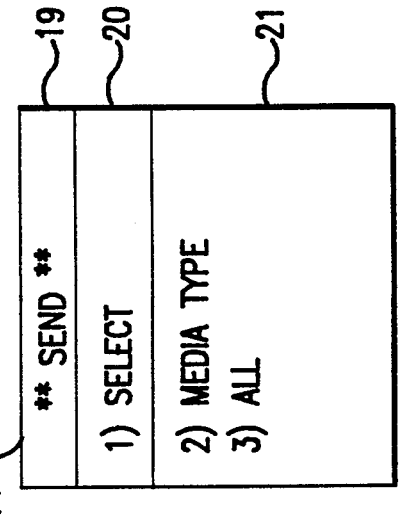

FIG. 3*e* illustrates the display 14 when the SEND function key is selected on the keypad 13. This function allows the user to transmit to a remote device via the communications interface 11, recorded albums' data stored in RAM 8. The remote device can, for example, be another computer or a printer. The Communications Program, which is stored in Program Memory 6, sets up the communications link between the present invention and the remote device. Once communications has been successfully initialized, the following options appear in the display 14's bottom line 20:

The SEND function primary menu item '1) Select', enables the user to send a single recorded album, stored in RAM 8, identified by the user entering a specific Label Number or User Class. Code on the keypad 13. The present invention prompts the user to enter a valid Label Number or User Class. Code. At this stage the user can select the NEXT key on the keypad 13, which allows the user to scroll through RAM 8 to obtain the required recorded album's data, indexed by either Label Number, or by User Class. Code. The user can also send all of the entries stored in RAM 8, identified by the user entering a Label Number, or a User Class. Code of −99 on the keypad 13. Once the user has entered a valid entry, the Format Program (stored in Program Memory 6) formats all of the relevant records in RAM 8 for transmission via the communications interface 11 to the remote device.

The SEND function primary menu item '2) Media Type', enables the user to send all recorded albums stored in RAM 8, identified by the same recorded album Media Type. For example, all recorded albums' description data for CDs, or for LP records stored in RAM 8 can be simultaneously transmitted. The present invention prompts the user to enter a valid Media Type by displaying a secondary menu on the display 14, the Enter Media Type menu, which is similar to FIG. 3k. This secondary menu allows the user to transmit recorded albums' data by specifying either the Media Type of recorded albums, or the SPARS code. Once the user has entered a valid entry, the Format Program formats all of the relevant records in RAM 8 for transmission via the communications interface 11 to the remote device.

The SEND function primary menu item '3) All', enables the user to send all recorded albums stored in RAM 8. The Format Program formats all of the relevant records in RAM 8 for transmission via the communications interface 11 to the remote device.

Figure 3F:
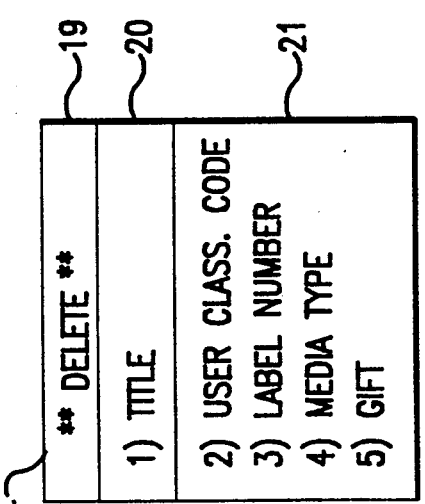

FIG. 3f illustrates the display 14 when the RECEIVE function key is selected on the keypad 13. This function allows the user to receive from a remote device, via the communications interface 11, recorded albums' data. The received data is directly stored in the RAM 8 by present invention, as if the user had individually entered each received recorded album into the invention. The Communications Program sets up the communications link between the present invention and the remote device. Once communications has been successfully initialized, data is transmitted into the present invention via the communication's interface 11.

FIG. 3g illustrates the display 16 when the ALARM function key is selected on the keypad 13. The MESG function key is similar in detail, except that the coincidence detection circuit 4 is not armed. The MESG function can conceptionally be thought of a 'note' repository.

The ALARM menu selection '1) Enter' enables the user to set a new alarm condition in the clock & calendar alarm 5 circuit. When the alarm entry selection is made, the present invention prompts the user to enter the date and time as to when the requested alarm is to be triggered. The user is then prompted to enter a message relating to the alarm condition. All the user entered alarm data is stored in the clock & calendar alarm 5 circuit. The CPU 7 initializes the coincidence detection circuit 4 to be triggered at the user's selected alarm date and time. When the coincidence detection circuit 4 triggers an existing ALARM condition, the ALARM's related message is displayed on the display 14's bottom line 20 by the Alarm Detection Program, which is stored in Program Memory 6. The Alarm Detection Program also displays on the display 14's top line 19 the message ' ALARM ACTIVE ' and it triggers an audio signal via the sound generator 12 and speaker 15. The user disables the audio alarm by pressing the ALARM function key twice. The alarm message remains active on the display's 14 bottom line 20, after the user has disabled the audio signal, for a limited period of time or until the user selects a function key on the keypad 13.

The ALARM menu function '2) Display' displays all of the information stored in the clock & calendar alarm 5 circuit, i.e. the date and times of the alarm messages and the text of the said alarms.

The ALARM menu function '3) Edit' enables the user to alter the times and dates and/or the associated ALARM descriptions stored in the clock & calendar alarm 5 circuit. The user selects the correct ALARM to be edited by scrolling through the stored ALARMs in the clock & calendar alarm 5 circuit by means of the NEXT and PRVS keys on the keypad 13, and upon finding the desired ALARM, presses the ENTER key on the keypad 13.

The ALARM menu function '4) Delete' deletes an entry in the clock & calendar alarm 5 circuit. The user selects the correct ALARM for deletion by scrolling through the stored ALARMs in the clock & calendar alarm 5 circuit by means of the NEXT and PRVS keys on the keypad 13, and upon finding the desired ALARM, presses the ENTER key on the keypad 13. The ALARM entry is then deleted from the clock & calendar alarm 5 circuit.

FIG. 3h illustrates the display 14 when the Enter Composition item on the ENTER primary menu has been selected. This selection is displayed in the top line 19. This secondary menu allows the user to enter to all pertinent data about a Composition into the present invention; the Composer Name, the Composition Title, the Composition Category, the Composition Recording Length and the Composition's Track Number that it occupies on the recorded album.

The ENTRY function secondary menu item '1) Composer Name' allows the user to enter the Composer's Name description data into the present invention, for a recorded album that currently exists in RAM 8. To select this option, the user presses the ENTER key whilst the Composer Name menu item is displayed on the display 14 bottom line 20, or the user can simply select the number '1' (one) on the keypad 13. Once the user has selected this menu item, the user will be prompted to enter the Composer's Name on the keypad 13, which is echoed on the display bottom line 20. For example, if the user was entering a Classical music CD with a recording of Beethoven's Concerto in D for Violin and Orchestra into the present invention, then this secondary menu item allows the user to enter 'Beethoven, Ludwig Van' into RAM 8, which is associated with the existing Record Co. data. The Composer Name menu item is a repeating item, allowing the user to enter multiple Composer Names, for the currently selected recorded album, into RAM 8 in a single data entry session. As soon as the user has entered a Composer Name into the present invention, a prompt appears on the display top line 19; ' Another Composer Name ? '. If the user wants to enter another Composer Name into the invention, then the user would select 'Y' on the keypad 13. If on the other hand the user does not want to enter another Composer Name into the invention, then the user would select 'N' on the keypad 13.

The ENTRY function secondary menu item '2) Title' allows the user to enter the composition Title description data into the present invention, for a recorded album that currently exists in RAM 8. To select this option, the user presses the ENTER key whilst the Title menu item is displayed on the display 14 bottom line 20, or the user can simply select the number '2' (two) on the keypad 13. Once the user has selected this menu item, the user will be prompted to enter the composition's Title on the keypad 13, which is echoed on the display bottom line 20. For example, if the user was entering a classical music CD with a recording of Beethoven's Concerto in D for Violin and Orchestra into the present invention, then this secondary menu item allows the user to enter 'Concerto in D for Violin and Orchestra' into RAM 8, which is associated with the existing Record Co. data. The Title menu item is a repeating item, allowing the user to enter multiple Titles, for the currently selected recorded album, into RAM 8 in a single data entry session. As soon as the user has entered a Title into the present invention, a prompt appears on the display top line 19; ' Another Title ? '. If the user wants to enter another Title into the invention, then the user would select 'Y' on the keypad 13. If on the other hand the user does not want to enter another Title into the invention, then the user would select 'N' on the keypad 13.

The ENTRY function secondary menu item '3) Category' allows the user to enter a composition's Category description data into the present invention, for a recorded album that currently exists in RAM 8. To select this option, the user presses the ENTER key whilst the Category secondary menu item is displayed on the display 14 bottom line 20, or the user can simply select the number '3' (three) on the keypad 13. Once the user has selected this menu item, a tertiary menu appears on the display 14, displaying ' Enter Category ' (not illustrated). This tertiary menu allows the user to associate one of the following categories with the audio composition; '1) Classical', '2) Jazz', '3) Rock', '4) Pop', '5) Soul', '6) Folk', '7) Rhythm & Blues', '8) Country & Western', '9) Reggae', '10) Rap' and '11) New Age'. The present invention simply uses this list as means of illustration and is consequently not limited to the said category list. If the user was entering audio-visual recorded albums into the present invention, then this said list would read; '1) Classic', '2) Musical', '3) Drama', '4) comedy', '5) Horror', '6) Mystery', '7) Suspense', '8) Documentary', '9) Music video', '10) science Fiction' etc. To select an item in the Category tertiary menu, the user presses the ENTER key whilst the category tertiary menu item is displayed on the display 14 bottom line 20, or the user can simply select the corresponding number associated with each unique Category on the keypad 13. For example, if the user was entering a classical music CD with a recording of Beethoven's Concerto in D for Violin and Orchestra into the present invention, then this secondary menu item allows the user to enter 'Classical' into RAM 8, which is associated with the current Record Co.'s composition data.

The ENTRY function secondary menu item '4) Recording Length' allows the user to enter a composition's Recording Length description data into the present invention, for a recorded album that currently exists in RAM 8. To select this option, the user presses the ENTER key whilst the Recording Length secondary menu item is displayed on the display 14 bottom line 20, or the user can simply select the number '4' (four) on the keypad 13. Once the user has selected this menu item, a tertiary menu appears on the display 14, displaying ' Enter Recording Length ' (not illustrated). This tertiary menu allows the user to enter the actual length of time that a Composition plays for (i.e. track length), in minutes and seconds.

The ENTRY function secondary menu item '5) Track Number' allows the user to enter a composition's Track Number description data into the present invention, for a recorded album that currently exists in RAM 8. This is the primary key for each composition on the recorded album. To select this option, the user presses the ENTER key whilst the Track Number secondary menu item is displayed on the display 14 bottom line 20, or the user can simply select the number '5' (five) on the keypad 13. Once the user has selected this menu item, a tertiary menu appears on the display 14, displaying ' Enter Track Number ' (not illustrated). This tertiary menu allows the user to enter the actual track number that a Composition occupies on the CD, tape, LP etc..

The ENTRY function secondary menu item '6) All' allows the user to enter all the associated composition description data into RAM 8. This option differs from all of the previously described data entry Composition secondary menu items, such that the present invention automatically prompts the user for all data entry description data, rather than the user selecting the required data entry item from a menu. To select this option, the user presses the ENTER key whilst the All menu item is displayed on the display 14 bottom line 20, or the user Can simply select the number '6' (six) on the keypad 13. Once the user has selected this menu item, the invention first prompts the user for Composer Name data and waits for the user to enter the relevant data; it then prompts the user for composition's Title data and waits for the user to enter the relevant data; it then prompts the user for composition's Category and waits for the user to enter the relevant data; it then prompts the user for the composition's Recording Length data and waits for the user to enter the relevant data; and finally it then prompts the user for composition's associated Track Number data and waits for the user to enter the relevant data.

FIG. 3*i* illustrates the display 14 when the Enter Performer item on the ENTER primary menu has been selected. This selection is displayed in the top line 19. This secondary menu allows the user to enter all of the pertinent data about a composition's performer, or performers, into the present invention; the composition's Artist Name, the composition's Conductor and the composition's Orchestra. Depending upon the composition's category, these menu items will vary. For example, if the composition Category is Rock and Roll, and the user is entering a CD with a recording of the Rolling Stone's 'Flowers'; then the user could enter the band leader Mick Jagger under the Artist Name menu item, or alternatively leave it blank; Conductor would not be displayed; orchestra would display 'Band' and the user would enter 'The Rolling Stones'. The present invention will display pertinent menu options dependent upon the composition Category. For the means of illustration only, the present invention uses a composition category of 'Classical'.

The ENTRY function secondary menu item '1) Artist Name' allows the user to enter the Artist's Name description data into the present invention, for a recorded album that currently exists in RAM 8. To select this option, the user presses the ENTER key whilst the Artist Name menu item is displayed on the display 14 bottom line 20, or the user can simply select the number '1' (one) on the keypad 13. Once the user has selected this menu item, the user will be prompted to enter the Artist's Name on the keypad 13, which is echoed on the display bottom line 20. For example, if the user was entering a classical music CD with a recording of Beethoven's Concerto in D for Violin and Orchestra, with Yehudi Menuhin as the principal violinist, into the present invention, then this secondary menu item allows the user to enter 'Menuhin, Yehudi' into RAM 8, which is associated with the existing Record Co. data. The Artist Name menu item is a repeating item, allowing the user to enter multiple Artist Names, for the currently selected recorded album, into RAM 8 in a single data entry session. This is because some compositions have multiple principal artists. As soon as the user has entered an Artist Name into the present invention, a prompt appears on the display top line 19; " Another Artist Name ? ". If the user wants to enter another Artist Name into the invention, then the user would select 'Y' on the keypad 13. If on the other hand the user does not want to enter another Artist Name into the invention, then the user would select 'N' on the keypad 13.

The ENTRY function secondary menu item '2) Conductor' allows the user to enter the composition Conductor description data into the present invention, for a recorded album that currently exists in RAM 8. To select this option, the user presses the ENTER key whilst the Conductor menu item is displayed on the display 14 bottom line 20, or the user can simply select the number '2' (two) on the keypad 13. Once the user has selected this menu item, the user will be prompted to enter the composition's Conductor on the keypad 13, which is echoed on the display bottom line 20. For example, if the user was entering a classical music CD With a recording of Beethoven's Concerto in D for Violin and Orchestra into the present invention, conducted by Toscanini, then this secondary menu item allows the user to enter 'Toscanini' into RAM 8, which is associated with the existing Record Co. data. The audiovisual equivalent of this datum is, for example, the film Director.

The ENTRY function secondary menu item '3) Orchestra' allows the user to enter the composition Orchestra description data into the present invention, for a recorded album that currently exists in RAM 8. To select this option, the user presses the ENTER key whilst the Orchestra menu item is displayed on the display 14 bottom line 20, or the user can simply select the number '3'](three) on the keypad 13. Once the user has selected this menu item, the user will be prompted to enter the composition's Orchestra on the keypad 13, which is echoed on the display bottom line 20. For example, if the user was entering a classical music CD with a recording of Beethoven's Concerto in D for Violin and Orchestra into the present invention, conducted by Toscanini with the NBC Symphony, then this secondary menu item allows the user to enter 'NBC Symphony' into RAM 8, which is associated with the existing Record Co. data.

The ENTRY function secondary menu item '4) All' allows the user to enter all the associated Performer description data into RAM 8. This option differs from all of the previously described data entry Performer secondary menu items, such that the present invention automatically prompts the user for all data entry description data, rather than the user selecting the required data entry item from a menu. To select this option, the user presses the ENTER key whilst the All menu item is displayed on the display 14 bottom line 20, or the user can simply select the number '4' (four) on the keypad 13. Once the user has selected this menu item, the invention first prompts the user for Artist Name data and waits for the user to enter the relevant data; it then prompts the user for composition's Conductor data and waits for the user to enter the relevant data; and finally it then prompts the user for composition's orchestra data and waits for the user to enter the relevant data.

FIG. 3j illustrates the display 14 when the Enter Record Co. item on the ENTER primary menu has been selected. This selection is displayed in the top line 19. This secondary menu allows the user to enter to all pertinent data about a recorded album into the present invention; this data includes the recorded album's Label Name, Label Number, and User classification Code. These data entry items on this menu uniquely identify the entered recorded album from other recorded albums stored in RAM 8.

The ENTRY function secondary menu item '1) Label Name' allows the user to enter the recorded album's Label Name description data into the present invention, for a recorded album that the user wants to store in RAM 8. The Label Name is the actual manufacturer of the recorded album, for example, CBS, Deutsche Grammophon, Stax etc. Depending upon the size of RAM 8, it is possible to store all the manufacturers' names in this said memory and then to present to the user a scrolling menu of the Label Names for data entry means. The present embodiment of the invention does not incorporate this feature. To select this option, the user presses the ENTER key whilst the Label Name menu item is displayed on the display 14 bottom line 20, or the user can simply select the number '1' (one) on the keypad 13. Once the user has selected this menu item, the user will be prompted to enter the Label Name on the keypad 13, which is echoed on the display bottom line 20.

The ENTRY function secondary menu item '2) Label Number' allows the user to enter the recorded album's Label Number description data into the present invention, for a recorded album that the user wants to store in RAM 8. The Label Number is the actual manufacturer's inventory code for the recorded album. For example the cassette tape recording of Van Halen's "Diver Down" on the Warner Brothers label, has a Label Number of M5-3677, whilst the LP recording of the same recording is BSK-3677. To select this option, the user presses the ENTER key whilst the Label Number menu item is displayed on the display 14 bottom line 20, or the user can simply select the number '2' (two) on the keypad 13. Once the user has selected this menu item, the user will be prompted to enter the Label Number on the keypad 13, which is echoed on the display bottom line 20. The combination of the Label Number and Label Name uniquely identifies a recorded album stored in RAM 8. In other words these two menu items are the primary key for the recorded album stored in RAM 8.

The ENTRY function secondary menu item '3) User Class. Code' allows the user to enter the recorded album's User Class. Code description data into the present invention, for recorded album that the user has stored in RAM 8. The User Class. Code is means provided by the present invention that allows the user to create their own classification code, or to use an existing classification code. This could be useful to a user who already has, for example, a card file system, and wants to convert the said system to the present invention, but already has a classification coding system which the user wants to continue using. An example of using an existing classification code is in the world of Classical audio recordings (i.e. Thematic Index). Here the user can enter the Kochel classification code for recordings of Mozart, the Schmeider classification code for recordings by J. S. Bach etc. In the Classical music world another type of classification code that the user can enter for this menu item is the Opus of the composition. This menu option provides such a means for the user. To select this option, the user presses the ENTER key whilst the User Class. Code menu item is displayed on the display 14 bottom line 20, or the user can simply select the number '3' (three) on the keypad 13. Once the user has selected this menu item, the user will be prompted to enter the User Class. Code on the keypad 13, which is echoed on the display bottom line 20. This code, if used, becomes an alternate key for the recorded album data stored in RAM 8.

The ENTRY function secondary menu item '2) Total Items' allows the user to enter the recorded album's Total Items description data into the present invention, for recorded album that the user has stored in RAM 8. The Total Items selection is, for example, the number of LPs or CDs that the recorded album has. For example the CD recording of the nine Beethoven symphonies on the London label, has a Total Items of 6, that is to say there are 6 CDs for this recorded album. To select this option, the user presses the ENTER key whilst the Total Items menu item is displayed on the display 14 bottom line 20, or the user can simply select the number '4' (four) on the keypad 13. Once the user has selected this menu item, the user will be prompted to enter the Total Items on the keypad 13, which is echoed on the display bottom line 20.

The ENTRY function secondary menu item '5) All' allows the user to enter all of the associated Record Co. description data into RAM 8. This option differs from all of the previously described data entry Record Co. secondary menu items, such that the present invention automatically prompts the user for all data entry description data, rather than the user selecting the required data entry item from a menu. To select this option, the user presses the ENTER key whilst the All menu item is displayed on the display 14 bottom line 20, or the user can simply select the number '5' (five) on the keypad 13. Once the user has selected this menu item, the invention first prompts the user for Label Name data and waits for the user to enter the relevant data; it then prompts the user for Label Number data and waits for the user to enter the relevant data; it then prompts the user for User Class. Code and waits for the user to enter the relevant data; and finally it prompts the user for Total Items data and waits for the user to enter the relevant data.

FIG. 3k illustrates the display 14 when the Enter Media Type item on the ENTER primary menu has been selected. This selection is displayed in the top line 19. The said secondary menu allows the user to enter to all pertinent data about a recorded album's recording into the present invention; this includes the Type of recorded album, the SPARs code and the Record Material. These data entry items store information about how the recorded album was recorded. For example, the fact that the recording is on chromium dioxide tape (Record Material), originally recorded on an Analog tape recorder, with a Digital mixdown and editing and finally with a Digital master process (SPARS Code).

The ENTRY function secondary menu item '1) Type' allows the user to enter the recorded album's Type description data into the present invention, for recorded album stored in RAM 8. The Type is the actual recording format, for example CD, LP or tape. To select this option, the user presses the ENTER key whilst the Type menu item is displayed on the display 14 bottom line 20, or the user can simply select the number '1' (one) on the keypad 13. Once the user has selected this menu item, the user will be prompted to select the Type from a tertiary menu (not shown) that is displayed on the bottom line 20.

The ENTRY function secondary menu item '2) SPARS Code' allows the user to enter the recorded album's SPARS Code description data into the present invention, for recorded album stored in RAM 8. The SPARS Code is a "Consumer Clarification Code" that has been developed by the Society of Professional Audio Recording Studios (SPARS). It is a three letter code, in which each letter is either an A (Analog), or a D (Digital). The first letter indicates the kind of tape recorder that was originally used to record the music; the second letter indicates how the mixdown and editing were done; and the third letter indicates the mastering process. For example Bruce Springsteen's CD recording of "Tunnel of Love" on the Columbia label has a SPARS code of "DDD". To select this option, the user presses the ENTER key whilst the SPARS Code menu item is displayed on the display 14 bottom line 20, or the user can simply select the number '2' (two) on the keypad 13. Once the user has selected this menu item, the user will be prompted to select the SPARS Code from a tertiary menu (not shown) that is displayed on the bottom line 20.

The ENTRY function secondary menu item '3) Recording Material' allows the user to enter the recorded album's Recording Material description data into the present invention, for recorded album stored in RAM 8. The Recording Material is the actual recording recorded album's chemical composition. This option is primarily used for Tape recorded album Types and identifies whether the Tape is Ferric Oxide (Type I), Chromium Dioxide (Type II) etc. To select this option, the user presses the ENTER key whilst the Recording Material menu item is displayed on the display 14 bottom line 20, or the user can simply select the number '3' (three) on the keypad 13. Once the user has selected this menu item, the user will be prompted to select the Recording Material from a tertiary menu (not shown) that is displayed on the bottom line 20.

The ENTRY function secondary menu item '4) All' allows the user to enter all the associated Media Type description data, for a selected recorded album, into RAM 8. This option differs from all of the previously described data entry Media Type secondary menu items, such that the present invention automatically prompts the user for all data entry description data, rather than the user selecting the required data entry item from a menu. To select this option, the user presses the ENTER key whilst the All menu item is displayed on the display 14 bottom line 20, or the user can simply select the number '4' (four) on the keypad 13. Once the user has selected this menu item, the invention first prompts the user for a recorded album's Type data and waits for the user to enter the relevant data; it then prompts the user for SPARS Code data and waits for the user to enter the relevant data; and finally it then prompts the user for Recording Material data and waits for the user to enter the relevant data.

FIG. 3l illustrates the display 14 when the Enter Purchase item on the ENTER primary menu has been selected. This selection is displayed in the top line 19. This secondary menu allows the user to enter to all pertinent Purchase data about a recording into the present invention; Price, Place of purchase and whether or not the recording was purchased as a Gift. The purchase Date and Time is automatically stored in RAM 8 together with this said Purchase data, when the user first enters the recording into the present invention. The Date and Time is retrieved from the Clock & Calendar circuit 3 by the CPU 7.

The ENTRY function secondary menu item '1) Price' allows the user to enter the recorded album's Price description data into the present invention, for a recorded album stored in RAM 8. The present embodiment of the invention records the Price data in the currency format of the user's country. It is possible to allow the user to enter the currency from a tertiary menu (not shown), if the invention is to be used internationally. To select this option, the user presses the ENTER key whilst the Price menu item is displayed on the display 14 bottom line 20, or the user can simply select the number '1' (one) on the keypad 13. Once the user has selected this menu item, the user will be prompted to enter the Price on the keypad 13, which is echoed on the display bottom line 20.

The ENTRY function secondary menu item '2) Place' allows the user to enter the recorded album's Place description data into the present invention, for a recorded album stored in RAM 8. This option allows the user to keep a record of where the recording was purchased. To select this option, the user presses the ENTER key whilst the Place menu item is displayed on the display 14 bottom line 20, or the user can simply select the number '2' (two) on the keypad 13. Once the user has selected this menu item, the user will be prompted to enter the Place on the keypad 13, which is echoed on the display bottom line 20.

The ENTRY function secondary menu item '3) Gift' allows the user to enter whether the recording, stored in RAM 8, was purchased as a Gift. This option allows the user to keep a record of the fact that the recording was purchased for somebody else besides the user. To select this option, the user presses the ENTER key whilst the Gift menu item is displayed on the display 14 bottom line 20, or the user can simply select the number '3' (three) on the keypad 13. Once the user has selected this menu item, a tertiary Enter Gift data menu appears on the display 14, prompting the user to enter the pertinent Gift data. Refer to the description of FIG. 3l for more detail on the Gift tertiary menu.

The ENTRY function secondary menu item '4) All' allows the user to enter all the associated Purchase description data, for a selected recorded album, into RAM 8. This option differs from all of the previously described data entry Purchase secondary menu items, such that the present invention automatically prompts the user for all data entry description data, rather than the user selecting the required data entry item from a menu. To select this option, the user presses the ENTER key whilst the All menu item is displayed on the display 14 bottom line 20, or the user can simply select the number '4' (four) on the keypad 13. Once the user has selected this menu item, the invention first prompts the user for recorded album's Price data and waits for the user to enter the relevant data; it then prompts the user for Place data and waits for the user to enter the relevant data; and finally it then prompts the user for Gift data and waits for the user to enter the relevant data.

FIG. 3m illustrates the display 14 when the Enter Gift item on the Enter Gift secondary menu has been selected. This selection is displayed in the top line 19. This tertiary menu allows the user to enter to all pertinent Gift data about a recording into the present invention; the Name of the person for whom the recording was purchased and the Occasion for which the recorded album was purchased.

The Enter Gift tertiary menu item '1) Name' allows the user to enter the Name description data for whom the recorded album was purchased as a Gift, into the present invention. To select this option, the user presses the Enter key whilst the Name menu item is displayed on the display 14 bottom line 20, or the user can simply select the number '1' (one) on the keypad 13. Once the user has selected this menu item, the user will be prompted to enter the Name on the keypad 13, which is echoed on the display bottom line 20.

The Enter Gift tertiary menu item '2) Occasion' allows the user to enter the Occasion description data for which the recorded album stored in RAM 8 was purchased as a Gift, into the present invention. To select this option, the user presses the Enter key whilst the Occasion menu item is displayed on the display 14 bottom line 20, or the user can simply select the number '2' (two) on the keypad 13. Once the user has selected this menu item, the user will be prompted to select the Occasion from a tertiary menu (not shown) that is displayed on the bottom line 20. Examples of the Occasion are; "Birthday", "Christmas", "Mother's Day", "Valentine's Day" etc.

The Enter Gift tertiary menu item '3) All' allows the user to enter all the associated Gift description data into RAM 8. This option differs from all of the previously described data entry Gift tertiary menu items, such that the present invention automatically prompts the user for all data entry description data, rather than the user selecting the required data entry item from a menu. To select this option, the user presses the Enter key whilst the All menu item is displayed on the display 14 bottom line 20, or the user can simply select the number '3' (three) on the keypad 13. Once the user has selected this menu item, the invention first prompts the user for Name for whom the recording was purchased as a Gift and waits for the user to enter the relevant data; and finally it then prompts the user for the Occasion for Which the recording was purchased as a Gift and waits for the user to enter the relevant data.

FIG. 3n illustrates the display 14 when the Search Composition item on the Search primary menu, FIG. 3b, has been selected. This selection is displayed in the display 14's top line 19. This secondary menu allows the user to search for any data about a recorded album's Composition that is currently stored in the present invention, namely; the Composer Name, the Composition Title, the Composition Category and the Composition Recording Length. The user can also search for other data on a recorded album stored in RAM 8. The secondary menus for the other data searches are not illustrated in this detailed description, but the relevant secondary menus are similar to the following ENTRY secondary menus; Search Performer is similar to Enter Performer, FIG. 3i; Search Record Co. is similar to Enter Record Co., FIG. 3j; Search Media Type is similar to Enter Media Type, FIG. 3k; Search Purchase is similar to Enter Purchase, FIG. 3l; Search Gift is similar to Enter Gift, FIG. 3m. The primary difference is the '* And ?' Search menu item, which is described later in this section. The following description of the Search Composition secondary menu is used to illustrate the use of the SEARCH function key.

The SEARCH function secondary menu item '1) Composer Name' allows the user to search for composer's Name description data in the present invention, for a either recorded album that currently exists in RAM 8, or for all recorded albums stored in RAM 8. In other words the present invention allows the user to execute a specific or global search. To select this option, the user presses the ENTER key whilst the Composer Name menu item is displayed on the display 14 bottom line 20, or the user can simply select the number '1' (one) on the keypad 13. Once the user has selected this menu item, the invention will prompt the user to enter the Composer's Name on the keypad 13. Once the user has entered the Composer Name, then the invention will prompt the user by displaying "* And ? *". This allows the user to combine other Search Composition criteria to further help narrow the scope of the user's search For example, if the user enters 'Y' on the keypad 13, then the user will be prompted to enter one of the remaining items on the secondary menu, namely Category or Title. Hence the user can search for Beethoven's 5th Piano Concerto, recorded on a CD in RAM 8. If the user does not want to use this functionality, then he simply enters 'N' on the keypad 13. The invention will then search RAM 8 for the required Composer Name. If the Search is specifically aimed at a single recorded album and if the data is found, the invention will display on the display 14's bottom line 20—'Data Found'. By selecting the NEXT key on the keypad 13, the user can scroll through and view on the display 14's bottom line 20, all the description data for the recorded album on which the Search for successful. If on the other hand the Search was unsuccessful for the specific recorded album, the invention displays on the display 14 bottom line 20—' Data Not Found '. If the user had selected to do a global search through RAM 8, then if the Search was successful, the invention will display on the display 14's bottom line 20—' Data Found '. By selecting the NEXT key on the keypad 13, the user can scroll through and view on the display 14's bottom line 20, all the recorded albums' that the global Search found for the user entered Composition Name.

The SEARCH function secondary menu item '2) Title' allows the user to search for the composition's Title description data in the present invention, for a either recorded album that currently exists in RAM 8, or for all recorded albums stored in RAM 8. To select this option, the user presses the ENTER key whilst the Title menu item is displayed on the display 14 bottom line 20, or the user can simply select the number '2' (two) on the keypad 13. Once the user has selected this menu item, the invention will prompt the user to enter the composition's Title on the keypad 13. Once the user has entered the Title, then the invention will prompt the user by displaying "* And ? *". This allows the user to combine other Search Composition criteria to further help narrow the scope of the user's Search. If the user does not want to use this functionality, then they simply enter 'N', instead of 'Y', on the keypad 13. The invention will then search RAM 8 for the required composition's Title. If the Search is specifically aimed at a single recorded album and if the data is found the invention will display on the display 14's bottom line 20—' Data Found '. By selecting the NEXT key on the keypad 13, the user can scroll through and view on the display 14's bottom line 20, all the description data for the recorded album on which the Search for successful. If on the other hand the Search was unsuccessful for the specific recorded album, the invention displays on the display 14 bottom line 20—' Data Not Found '. If the user had selected to do a global Search through RAM 8 and if the Search was successful, the invention will display on the display 14's bottom line 20—' Data Found '. By selecting the NEXT key on the keypad 13, the user can scroll through and view on the display 14's bottom line 20, all the recorded albums' for which the global Search found the user entered Title.

The SEARCH function secondary menu item '3) Category' allows the user to search for a composition's Category description data in the present invention for a either recorded album that currently exists in RAM 8, or for all recorded albums stored in RAM 8. To select this option, the user presses the ENTER key whilst the Category secondary menu item is displayed on the display 14 bottom line 20, or the user can simply select the number '3' (three) on the keypad 13. Once the user has selected this menu item, the invention will prompt the user to enter the composition's Category on the keypad 13. Once the user has entered the Category, then the invention will prompt the user by displaying "* And ? *". This allows the user to combine other Search Composition criteria to further help narrow the scope of the user's Search. If the user does not want to use this functionality, then they simply enter 'N', instead of 'Y', on the keypad 13. The invention will then search RAM 8 for the required composition's Category. The same functionality as described above for a successful and unsuccessful Search applies to this Search as well. Refer to either the Composer Name, or the Title search descriptions for more detail.

FIG. 3o illustrates the display 14 when the Modify Composition item on the Modify primary menu, FIG. 3c, has been selected. This selection is displayed in the top line 19. This secondary menu allows the user to modify any data about a recorded album's Composition that is currently stored in the present invention, namely; the Composer Name, the Composition Title, the Composition Category and the composition Recording Length. The user can also modify other data on a recorded album stored in RAM 8. The secondary menus for the other data modification are not illustrated in this detailed description, but the relevant secondary menus are similar to the following ENTRY secondary menus; Modify Performer is similar to Enter Performer, FIG. 3i; Modify Record Co. is similar to Enter Record Co., FIG. 3j; Modify Media Type is similar to Enter Media Type, FIG. 3k; Modify Purchase is similar to Enter Purchase, FIG. 3l; Modify Gift is similar to Enter Gift, FIG. 3m. The following description of the Modify Composition secondary menu is used to illustrate the use of the MODIFY function key.

The MODIFY function secondary menu item '1) Composer Name' allows the user to modify the Composer's Name description data in the present invention, for a recorded album that currently exists in RAM 8. To select this option, the user presses the Modify key whilst the Composer Name menu item is displayed on the display 14 bottom line 20, or the user can simply select the number '1' (one) on the keypad 13. Once the user has selected this menu item, the invention will prompt the user to enter the Composer's Name on the keypad 13. At this stage the user can press the NEXT key on the keypad 13, which allows the user to scroll through RAM 8 to obtain the required recorded album's Composer's Name, which is displayed on the display 14 bottom line 20. If the user enters the Composer's Name on the keypad 13, the invention will validate the entry. Using the scroll mode, or entering valid data on the keypad 13, as soon as the required data is displayed in the bottom line 20, the user can modify the said data. Data modification is terminated when the user selects the ENTER key on the keypad 13. The invention then displays a prompt on the display top line 19; ' Another Composer Name ? '. If the user wants to modify another Composer Name for the currently selected recorded album then the user would select 'Y' on the keypad 13. If on the other hand the user does not want to want to modify another Composer Name, then the user would select 'N' on the keypad 13.

The MODIFY function secondary menu item '2) Title' allows the user to modify the composition's Title description data in the present invention, for a recorded album that currently exists in RAM 8. To select this option, the user presses the ENTER key whilst the Title menu item is displayed on the display 14 bottom line 20, or the user can simply select the number '2' (two) on the keypad 13. Once the user has selected this menu item, the user will be prompted to enter the composition's Title on the keypad 13, which is echoed on the display bottom line 20. At this stage the user can press the NEXT key on the keypad 13, which allows the user to scroll through RAM 8 to obtain the required recorded album's Title which is displayed on the display 14 bottom line 20. If the user enters the Title on the keypad 13, the invention will validate the entry. Using the scroll mode, or entering valid data on the keypad 13, as soon as the required data is displayed in the bottom line 20, the user can modify the said data. Data modification is terminated when the user selects the ENTER key on the keypad 13. The invention then displays a prompt on the display top line 19; ' Another Title ? '. If the user wants to modify another Title for the currently selected recorded album then the user would select 'Y' on the keypad 13. If on the other hand the user does not want to want to modify another Title, then the user would select 'N' on the keypad 13.

The MODIFY function secondary menu item '3) Category' allows the user to modify a composition's Category description data in the present invention, for a recorded album that currently exists in RAM 8. To select this option, the user presses the ENTER key whilst the Category secondary menu item is displayed on the display 14 bottom line 20, or the user can simply select the number '3' (three) on the keypad 13. Once the user has selected this menu item, the currently stored category data is displayed on the display 14. By selecting the NEXT key on the keypad 13, the Category tertiary menu is displayed from which the user can select a new Category. Refer to FIG. 3h for more detail on the selection of a Category.

The MODIFY function secondary menu item '4) Recording Length' allows the user to modify a composition's Recording Length description data in the present invention, for a recorded album that currently exists in RAM 8. To select this option, the user presses the ENTER key whilst the Recording Length secondary menu item is displayed on the display 14 bottom line 20, or the user can simply select the number '4' (four) on the keypad 13. Once the user has selected this menu item, a tertiary menu appears on the display 14, displaying ' Enter Recording Length ' (not illustrated). This tertiary menu allows the user to enter the actual length of time that a Composition plays for (i.e. track length), in minutes and seconds.

The MODIFY function secondary menu item '5) Track Number' allows the user to modify a composition's Track Number description data in the present invention, for a recorded album that currently exists in RAM 8. To select this option, the user presses the ENTER key whilst the Track Number secondary menu item is displayed on the display 14 bottom line 20, or the user can simply select the number '5' (five) on the keypad 13. Once the user has selected this menu item, the currently stored Track Number for the Composition is displayed on the display 14, at which time the user can modify the data. The present invention validates the modified Track Number ensuring that it is unique for the current recorded album.

The MODIFY function secondary menu item '6) All' allows the user to modify all the associated Composition description data in RAM 8 for a currently stored recorded album, without having to use the specific secondary menu items as described above. It is similar in functionality to Enter composition '6) All', which is described in FIG. 3h.

FIG. 3p illustrates the display 14 when the Delete Gift item on the Delete primary menu, FIG. 3d, has been selected. This selection is displayed in the top line 19. This secondary menu allows the user to delete all Gift data about a recorded album from the present invention. The user can also delete other data from a recorded album stored in RAM 8. The secondary menus for the other data deletions are not illustrated in this detailed description, but the relevant secondary menus are similar to the following ENTRY secondary menus; Delete Composition is similar to Enter composition, FIG. 3h; Delete Performer is similar to Enter Performer, FIG. 3i; Delete Record Co. is similar to Enter Record Co., FIG. 3j; Delete Media Type is similar to Enter Media Type, FIG. 3k; Delete Purchase is similar to Enter Purchase, FIG. 3l. The following description of the Delete Gift secondary menu is used to illustrate the use of the DELETE function key.

The DELETE function secondary menu item '1) Name' allows the user to delete the Name description data for whom the recorded album stored in RAM 8 was purchased as a Gift. To select this option, the user presses the Enter key whilst the Name menu item is displayed on the display 14 bottom line 20, or the user can simply select the number '1' (one) on the keypad 13. Once the user has selected this menu item, the user will be prompted to enter the Name On the keypad 13, which is echoed on the display bottom line 20. At this stage the user can press the NEXT key on the keypad 13, which allows the user to scroll through RAM 8 to obtain the required recorded album's gift Name, which is displayed on the display 14 bottom line 20. If the user enters the gift's Name on the keypad 13, the invention will validate the entry. Using the scroll mode, or entering valid data on the keypad 13, as soon as the required data is displayed in the bottom line 20, the user can delete the said data. Data deletion is executed when the user selects the ENTER key on the keypad 13. The invention then displays a prompt on the display top line 19; ' Are You Sure ?'. If the user enters 'Y' on the keypad 13, then the displayed data is deleted. On the other hand, if the user enters 'N', then the data is not deleted, and the Delete Gift secondary menu is displayed on the display 14.

The DELETE function secondary menu item '2) Occasion' allows the user to delete the Occasion description data for which the recorded album stored in RAM 8 was purchased as a Gift. To select this option, the user presses the Enter key whilst the Occasion menu item is displayed on the display 14 bottom line 20, or the user can simply select the number '2' (two) on the keypad 13. The same functionality as described above for deleting gift Name data, applies here as well.

The invention being thus described, it will be obvious that the same may be varied in a multiplicity of ways. Such variations are not to be regarded as a departure from the spirit and scope of the invention, and all such modifications are intended to be included within the scope of the following claims,

What is claimed is:

1. A method of inventorying, cataloguing and searching consumer purchased and acquired audio recordings comprising the steps of:
    a) providing a compact handheld portable electronic computing device having a programmable memory, program accessible memory, output display means, data entry input means and external electronic data transfer means,
    b) entering by means of said data entry input means (i) input data for a specific audio recording and storing said input data in the program accessible memory, entering by means of said data entry input means (ii) input data for a plurality of audio recordings and storing said input data in the program accessible memory,
    c) displaying said input data on the output display means,
    d) (i) receiving by means of said external electronic data transfer means data from an external electronic device, (ii) sending by means of said external electronic data transfer means the input data to an external electronic device,
    e) providing said programmable memory with a program to automatically catalog said input data by a plurality of consumer audio recording catalog criteria,
    f) storing said consumer audio recording catalog criteria in said programmable memory, and cataloguing said input data according to said catalog criteria by said computing device according to said catalog program,
    g) providing said programmable memory with a program to automatically inventory said input data by a plurality of audio recording inventory criteria,
    h) storing said consumer audio recording inventory criteria in said programmable memory, and inventorying said input data according to said inventory criteria by said computing device according to said inventory program,
    i) searching by said computing device said stored input data by at least one of said plurality of consumer audio recording inventory criteria and said plurality of consumer audio recording catalog criteria, and displaying on said output display means stored input data identified by said searching,
    j) modifying any of said stored input data for a specific audio recording selected by the consumer for modification using said data entry input means,
    k) deleting any of (i) said stored input data for a specific audio recording, deleting any of (ii) said stored input data for a plurality of audio recordings selected by the consumer for deletion using said data entry input means.

2. A method as in claim 1 wherein said input data consists of an audio recording's record company data, composition data, performer data, media type data, purchase data and gift data.

3. A method as in claim 2 comprising the step wherein the consumer selects to enter input data, whereafter said device prompts the consumer on said output display means to select from a choice of audio recording input data comprising the categories of; record company data, performer data, composition data, audio recording media type data, purchase data and gift data.

4. A method as in claim 3 comprising the step whereby the consumer selects said record company data category, said method further including the steps:
    a) said device prompting the consumer on said output display means to enter said record company data,
    b) said record company data comprising an audio recording's manufacturer's label name, a manufacturer's label number of the audio recording and a consumer's classification code for the audio recording,
    c) said device comparing the consumer entered record company input data with record company data previously stored in said program accessible memory means and producing an output responsive to said comparison.

5. A method as in claim 3 comprising the step whereby the consumer selects said composition data category, said method further including the steps;
    a) said device prompting the consumer on said output display means to enter said composition data,
    b) said composition data comprises (a) a plurality of composer names, a plurality of titles, an audio category, a recording length and a recording track number and (b) a composer name, a title, an audio category, a recording length and a recording track number,
    c) said device determining if said composition data is linked to record company data stored in said program accessible memory, if said link does not exist then said device produces an output response on said output display means, whereafter the device prompts the consumer to enter record company data which is linked to said composition data in said program accessible memory.

6. A method as in claim 3 comprising the step whereby the consumer selects said performer data category, said method further including the steps;
    a) said device prompting the consumer on said output display means to enter said performer data,
    b) said performer data comprises (i) a plurality of artist names, conductor names and orchestra names, (ii) a plurality of artist names, band leader names and band names, (iii) an artist name, a conductor name and an orchestra name and (iv) an artist name, a band leader name and a band name,
    c) said device determining if said performer data is linked to record company data stored in said program accessible memory, if said link does not exist then said device produces an output response on said output display means, whereafter the device prompts the consumer to enter record company data which is linked to said performer data in said program accessible memory.

7. A method as in claim 3 comprising the step whereby the consumer selects said audio recording media type data category, said method further including the steps:
    a) said device prompting the consumer on said output display means to enter said media type data, b) said audio recording media type data comprises a recording type, a SPARS Consumer Clarification Code and the recording's recording material, c) sand whether said recording is a long playing record, a tape, a digital audio tape and a compact disc, d) said device determining if said media type data is linked to record company data stored in said program accessible memory, if said link does not exist then said device produces an output response on said output display means, whereafter the device prompts the consumer to enter record company data which is linked to said media type data in said program accessible memory.

8. A method as in claim 3 comprising the step whereby the consumer selects said purchase data category, said method further including the steps;

a) said device prompting the consumer on said output display means to enter said purchase data.

b) said purchase data comprises the price of the audio recording and the place of purchase of the audio recording, c) said device determining if said purchase data is linked to record company data stored in said program accessible memory, if said link does not exist then said device produces an output response on said output display means, whereafter the device prompts the consumer to enter record company data which is linked to said purchase data in said program accessible memory.

9. A method as in claim 3 comprising the step whereby the consumer selects said gift data category, said method further including the steps;

a) said device prompting the consumer on said output display means to enter said gift data, b) said gift data comprises the name for whom the audio recording was purchased and the occasion for which the audio recording was purchased, c) said device determining if said gift data is linked to record company data stored in said program accessible memory, if said link does not exist then said device produces an output response on said output display means, whereafter the device prompts the consumer to enter record company data which is linked to said gift data in said program accessible memory.

10. A method as in claim 2 comprising the step wherein the consumer selects to search input data stored in said program accessible memory means, whereafter said device prompts the consumer on said output display means to select from a choice of audio recording inventory data comprising of the categories of; record company data, performer data, composition data, audio recording media type data, purchase data and gift data.

11. A method as in claim 10 comprising the step whereby the consumer selects said record company data category, said method further including the steps;

a) said device prompting the consumer on said output display means to select search category criteria from said record company data comprising of an audio recording's manufacturer's label name, a manufacturer's label number of the audio recording and a consumer's classification code for the audio recording, b) said device displaying an output responsive to consumer's search category criteria on said output display means.

12. A method as in claim 10 comprising the step whereby the consumer selects said composition data category, said method further including the steps;

a) said device prompting the consumer on said output display means to select search category criteria from said composition data, said composition data comprising of a composer name, a title and an audio category, b) said device displaying an output responsive to consumer's search category criteria on said output display means.

13. A method as in claim 10 comprising the step whereby the consumer selects said performer data category, said method further including the steps;

a) said device prompting the consumer on said output display means to select search category criteria from said performer data, said performer data comprising of (i) an artist name, conductor name and an orchestra name, (ii) an artist name, a band leader and a band name, b) said device displaying an output responsive to consumer's search category criteria on said output display means.

14. A method as in claim 10 comprising the step whereby the consumer selects said media type data category, said method further including the steps;

a) said device prompting the consumer on said output display means to select search category criteria from said media type data, said media type data comprising of a recording type, a SPARS Consumer Clarification Code and a recording's recording material, b) said device displaying an output responsive to consumer's search category criteria on said output display means.

15. A method as in claim 10 comprising the step whereby the consumer selects said purchase data category, said method further including the steps;

a) said device prompting the consumer on said output display means to select search category criteria from said purchase data, said purchase data comprising of the price of the audio recording, the place of purchase of the audio recording, b) said device displaying an output responsive to consumer's search category criteria on said output display means.

16. A method as in claim 10 comprising the step whereby the consumer selects said gift data category, said method further including the steps;

a) said device prompting the consumer on said output display means to select search category criteria from said gift data, said gift data comprising of the name for whom the audio recording was purchased and the occasion for which the audio recording was purchased, b) said device displaying an output responsive to consumer's search category criteria on said output display means.

17. A method as in claim 2 comprising the step wherein the consumer selects to modify input data stored in said program accessible memory, whereafter said device prompts the consumer on said output display means to select from a choice of audio recording input data comprising of the categories of; record company data, performer data, composition data, audio recording media type data, purchase data and gift data.

18. A method as in claim 17 comprising the step whereby the consumer selects said record company data category, said method further including the steps;
 a) said device prompting the consumer on said output display means to modify said record company data,
 b) said record company data comprising of an audio recording's manufacturer's label name, a manufacturer's label number of the audio recording and a consumer's classification code for the audio recording,
 c) said device comparing the consumer entered record company input data with record company data previously stored in said program accessible memory means and producing an output responsive to said comparison,
 d) said device displaying an output responsive to consumer's modification on said output display means.

19. A method as in claim 17 comprising the step whereby the consumer selects said composition data category, said method further including the steps;
 a) said device prompting the consumer on said output display means to modify said composition data,
 b) said composition data comprises (a) a plurality of composer names, a plurality of titles, an audio category, a recording length and a recording track number and (b) a composer name, a title, an audio category, a recording length and a recording track number,
 c) said device comparing the consumer entered composition data with composition data previously stored in said program accessible memory means and producing an output responsive to said comparison,
 d) said device displaying an output responsive to consumer's modification on said output display means.

20. A method as in claim 17 comprising the step whereby the consumer selects said performer data category, said method further including the steps;
 a) said device prompting the consumer on said output display means to modify said performer data,
 b) said performer data comprises (i) a plurality of artist names, conductor names and orchestra names, (ii) a plurality of artist names, band leader names and band names, (iii) an artist name, a conductor name and an orchestra name and (iv) an artist name, a band leader name and a band name,
 c) said device comparing the consumer entered performer data with performer data previously stored in said program accessible memory means and producing an output responsive to said comparison,
 d) said device displaying an output responsive to consumer's modification on said output display means.

21. A method as in claim 17 comprising the step whereby the consumer selects said audio recording media type data category, said method further including the steps;
 a) said device prompting the consumer on said output display means to modify said media type data,
 b) said audio recording media type data comprises a recording type, a SPARS Consumer Clarification Code and the recording's recording material,
 c) and whether said recording is a long playing record, a tape, a digital audio tape or a compact disc,
 d) said device comparing the consumer entered media type data with media type data previously stored in said program accessible memory means and producing an output responsive to said comparison,
 e) said device displaying an output responsive to consumer's modification on said output display means.

22. A method as in claim 17 comprising the step whereby the consumer selects said purchase data category, said method further including the steps;
 a) said device prompting the consumer on said output display means to modify said purchase data,
 b) said purchase data comprises the price of the audio recording, the place of purchase of the audio recording and gift data,
 c) said device comparing the consumer entered purchase data with purchase data previously stored in said program accessible memory means and producing an output responsive to said comparison,
 d) said device displaying an output responsive to consumer's modification on said output display means.

23. A method as in claim 17 comprising the step whereby the consumer selects said gift data category, said method further including the steps;
 a) said device prompting the consumer on said output display means to modify said gift data,
 b) said gift data comprises the name for whom the audio recording was purchased and the occasion for which the audio recording was purchased,
 c) said device comparing the consumer entered gift data with gift data previously stored in said program accessible memory means and producing an output responsive to said comparison,
 d) said device displaying an output responsive to consumer's modification on said output display means.

24. A method as in claim 2 comprising the step wherein the consumer selects to delete input data stored in said program accessible memory, whereafter said device prompts the consumer on said output display means to select from a choice of audio recording input data comprising of the categories of; record company data, composition data, audio recording media type data and gift data.

25. A method of inventorying, cataloguing and searching consumer purchased and acquired audio visual recordings comprising the steps of:
 a) providing a compact handheld portable electronic computing device having a programmable memory, program accessible memory, output display means, data entry input means and external electronic data transfer means,
 b) entering by means of said data entry input means (i) input data for a specific audio visual recording and storing said input data in the program accessible memory, entering by means of said data entry input means (ii) input data for a plurality of audio visual recordings and storing said input data in the program accessible memory,
 c) displaying said input data on the output display means,
 d) (i) receiving by means of said external electronic data transfer means data from an external electronic device, (ii) sending by means of said external electronic data transfer means the input data to an external electronic device, e) providing said programmable memory with a program to automatically catalog said input data by a plurality of consumer audio visual recording catalog criteria,
f) storing said consumer audio visual recording catalog criteria in said programmable memory, and cataloguing said input data according to said catalog criteria by said computing device according to said catalog program,
g) providing said programmable memory with a program to automatically inventory said input data by a plurality of audio visual recording inventory criteria,
h) storing said consumer audio recording inventory criteria in said programmable memory, and inventorying said input data according to said inventory criteria by said computing device according to said inventory program,
i) searching by said computing device said stored input data by at least one of said plurality of consumer audio visual recording inventory criteria and said plurality of consumer audio visual recording catalog criteria, and displaying on said output display means stored input data identified by said searching,
j) modifying any of said stored input data for a specific audio visual recording selected by the consumer for modification using said data entry input means,
k) deleting any of (i) said stored input data for a specific audio visual recording, deleting any of (ii) said stored input data for a plurality of audio recordings selected by the consumer for deletion using said data entry input means.

26. A method as in one of claim 1 or 25 wherein said input means ia a keyboard and a barcode reader and said output display means is a multi-line display panel.

* * * * *